United States Patent
Pignataro et al.

(10) Patent No.: US 12,464,056 B2
(45) Date of Patent: Nov. 4, 2025

(54) SUSTAINABILITY-BASED SERVICE FUNCTION CHAIN BRANCHING

(71) Applicant: Cisco Technology, Inc., San Jose, CA (US)

(72) Inventors: Carlos M. Pignataro, Cary, NC (US); Nagendra Kumar Nainar, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 99 days.

(21) Appl. No.: 18/332,884

(22) Filed: Jun. 12, 2023

(65) Prior Publication Data

US 2024/0414245 A1    Dec. 12, 2024

(51) Int. Cl.
*H04L 67/63* (2022.01)
*G06F 1/3287* (2019.01)
*H04L 47/2425* (2022.01)

(52) U.S. Cl.
CPC ............ *H04L 67/63* (2022.05); *G06F 1/3287* (2013.01); *H04L 47/2425* (2013.01)

(58) Field of Classification Search
CPC ..... H04L 43/08; H04L 45/70; H04L 47/2425; H04L 67/63; G06F 1/3287
See application file for complete search history.

(56) References Cited

U.S. PATENT DOCUMENTS

| | | | | |
|---|---|---|---|---|
| 7,920,468 B2* | 4/2011 | Simonis | ................... | H04L 43/00 370/252 |
| 9,467,925 B1* | 10/2016 | Baroudi | .............. | H04L 41/0803 |
| 9,565,102 B2* | 2/2017 | Zhang | ................... | H04L 47/829 |
| 9,571,405 B2* | 2/2017 | Pignataro | ................ | H04L 69/22 |
| 9,723,106 B2* | 8/2017 | Shen | ................... | H04L 41/5054 |
| 9,819,583 B2* | 11/2017 | Dharmadhikari | ....... | H04L 43/08 |
| 10,050,878 B2* | 8/2018 | Pande | ................. | H04L 47/2458 |
| 10,225,270 B2* | 3/2019 | Reddy | ................ | H04L 63/1408 |
| 10,243,922 B2* | 3/2019 | Bifulco | ................... | H04L 45/64 |
| 11,277,338 B2* | 3/2022 | Drake | ................... | H04L 69/325 |
| 11,689,431 B2* | 6/2023 | Kumar | ................ | H04L 47/2425 370/312 |

(Continued)

OTHER PUBLICATIONS

Hajar Hantouti et al. "Traffic Steering for Service Function Chaining", IEEE Communications Surveys & Tutorials, vol. 21, No. 1, First Quarter 2019, 21 pages. (Year: 2019).*

(Continued)

*Primary Examiner* — G. C. Neurauter, Jr.
(74) *Attorney, Agent, or Firm* — Edell, Shapiro & Finnan, LLC

(57) ABSTRACT

Techniques to add environmental-impact and energy sustainability criteria and support to service function chains (SFCs). These techniques enabling steering of network traffic that carries energy sustainability related metadata within in an SFC based on energy sustainability or "green criteria." This allows for achieving, for example, so-called "green Operations, Administration and Maintenance (OAM)", whether realized with Network Service Header (NSH), Segment Routing, Multi-protocol Label Switching (MPLS), etc. In other words, these techniques enhance service functions (SFs) and SFCs to allow for finding an energy sustainable or green path in an SFC, and to allow for conveying environmental information as in-line metadata.

21 Claims, 6 Drawing Sheets

(56) References Cited

U.S. PATENT DOCUMENTS

| | | | |
|---|---|---|---|
| 11,818,006 B2* | 11/2023 | Palmero | G06Q 10/04 |
| 11,863,388 B1* | 1/2024 | Pignataro | H04W 40/10 |
| 2012/0047504 A1* | 2/2012 | Morris | G06F 9/5094 |
| | | | 718/100 |
| 2017/0099210 A1 | 4/2017 | Fardid et al. | |
| 2017/0163531 A1* | 6/2017 | Kumar | H04L 45/74 |
| 2017/0264537 A1* | 9/2017 | Patil | H04L 45/566 |
| 2017/0264713 A1 | 9/2017 | Shen et al. | |
| 2017/0373990 A1* | 12/2017 | Jeuk | H04L 45/64 |
| 2021/0176166 A1 | 6/2021 | Starsinic et al. | |
| 2024/0214300 A1* | 6/2024 | Druta | H04W 40/10 |
| 2024/0333633 A1* | 10/2024 | Pignataro | H04L 69/22 |

OTHER PUBLICATIONS

Jian Sun et al. "Energy Efficient Deployment of a Service Function Chain for Sustainable Cloud Applications", Sustainability 2018, 10, 3499, Sep. 2018, 25 pages. (Year: 2018).*

Qi Xu et al. "An Energy-aware Method for Multi-domain Service Function Chaining", Journal of Internet Technology vol. 19 (2018) No. 6, 14 pages. (Year: 2018).*

Deval Bhamare et al. "A Survey on Service Function Chaining", Journal of Network and Computer Applications, vol. 75, Nov. 2016, pp. 138-155, 19 pages. (Year: 2016).*

Md. Faizul Bari et al. "ESSO: An Energy Smart Service Function Chain Orchestrator", IEEE Transactions on Network and Service Management, vol. 16, No. 4, Dec. 2019, 15 pages. (Year: 2019).*

Luca Chiaraviglio et al. "Modeling sleep mode gains in energy-aware networks", Elsevier, Computer Networks 57 (2013) 3051-3066, 16 pages. (Year: 2013).*

Fatima Salahdine et al. "A survey on sleep mode techniques for ultra-dense networks in 5G and beyond", Elsevier Computer Networks 201 (2021) 108567, 19 pages. (Year: 2021).*

Fatma Ezzahra Salem et al. "Reinforcement learning approach for Advanced Sleep Modes management in 5G networks", IEEE, 2018, 5 pages. (Year: 2018).*

J. Guichard, Ed., et al., Network Service Header (NSH) MD Type 1: Context Header Allocation (Data Center), draft-ietf-sfc-nsh-dc-allocation-02, Service Function Chaining, Internet-Draft, Intended status: Informational, Sep. 25, 2018, 15 pages, https://datatracker.ietf.org/doc/html/draft-ietf-sfc-nsh-dc-allocation-02.

W. Haeffner, et al., "Service Function Chaining Use Cases in Mobile Networks," draft-ietf-sfc-use-case-mobility-09, Service Function Chaining, Internet-Draft, Intended status: Informational, Jan. 2, 2019, 51 pages, https://datatracker.ietf.org/doc/html/draft-ietf-sfc-use-case-mobility-09.

CJ. Bernardos, et al., "Service Function discovery in fog environments," draft-bernardos-sfc-discovery-04, SFC WG, Internet-Draft, Intended status: Experimental, Mar. 11, 2020, 17 pages, https://datatracker.ietf.org/doc/html/draft-bernardos-sfc-discovery-04#section-4.

Lingli Deng, et al., "Endpoint Properties Extensions," Internet Engineering Task Force, IETF 92, draft-deng-alto-p2p-ext-05, Mar. 26, 2015, 16 pages.

E. Chen, et al., "Carrying Geo Coordinates in BGP," draft-chen-idr-geo-coordinates-02.txt, Network Working Group, Internet Draft, Intended Status: Standards Track, Oct. 28, 2016, 16 pages, https://datatracker.ietf.org/doc/html/draft-chen-idr-geo-coordinates-02#section-1.

Enke Chen, et al., "Carrying Geo Coordinates in BGP," Internet Engineering Task Force, IETF 96, Draft-chen-idr-geo-coordinates-01, Jul. 18, 2016, 7 pages.

Acee Lindem, et al., "OSPF Geo Location," Internet Engineering Task Force, IETF 95, draft-acee-ospf-geo-location-02, Apr. 7, 2016, 6 pages.

Naiming Shen, et al., "IS-IS Geo Location," Internet Engineering Task Force, IETF 96, draft-shen-isis-geo-coordinates-01, Jul. 19, 2016, 5 pages.

P. Psenak, Ed., et al., "OSPF Extensions for Segment Routing," Internet Engineering Task Force (IETF), RFC 8665, Category: Standards Track, Dec. 2019, 25 pages.

S. Previdi, Ed., et al., "IS-IS Extensions for Segment Routing," Internet Engineering Task Force (IETF), RFC 8667, Category: Standards Track, Dec. 2019, 28 pages.

"Climate Impact by Area," Electricity Maps, retrieved Jul. 12, 2023, 1 page, https://app.electricitymaps.com/map.

"Product Catalog," Electric Maps, retrieved Jul. 12, 2023, 1 page, https://api-portal.electricitymaps.com.

"Emissions & Generation Resource Integrated Database (eGRID)," United States Environmental Protection Agency, Jan. 31, 2023, 13 pages, https://www.epa.gov/egrid.

Danny A. Lachos, et al., "Multi-domain Service Function Chaining with ALTO-00," Internet Engineering Task Force, IETF 10—SFC WG, Jul. 19, 2018, 13 pages.

Cianfrani A., et al., "An Energy Saving Routing Algorithm for a Green OSPF Protocol", 2010 Infocom IEEE Conference on Computer Communications Workshops, Nov. 2010, 5 pages.

Clad F., et al., "Service Programming with Segment Routing", Internet-Draft: draft-ietf-spring-sr-service-programming-07, Feb. 15, 2023, 32 pages.

D'Arienzo M., et al., "GOSPF: an Energy Efficient Implementation of the OSPF Routing Protocol", Journal of Network and Computer Applications, Jul. 4, 2022, pp. 1-32.

Guichard J., et al., "Integration of Network Service Header (NSH) and Segment Routing for Service Function Chaining (SFC) draft-ietf-spring-nsh-sr-13", Internet-Draft, Apr. 2023, 18 pages.

Halpern J., et al., "Service Function Chaining (SFC) Architecture," RFC 7665, The Internet Society, Oct. 2015, 32 Pages.

Hossain M., "Concept of NSH and Metadata: Paving the Creation of New Transport Agonistic Service Plane in 5G Era", Oct. 16, 2021, 12 pages.

Manjate J.A., et al., "Energy-Efficient Networks under Coordinated and Uncoordinated Sleeping Approaches", IEEE Conference Proceedings, Sep. 2015, 5 pages.

Quinn P., et al., "Network Service Header (NSH)," Internet Engineering Task Force (IETF), Request for Comments: 8300, ISSN: 2070-1721, The Internet Society, Jan. 2018, 40 pages.

Sun G., et al., "Energy-efficient and Traffic-aware Service Function Chaining Orchestration in Multi-domain Networks", Future Generation Computer Systems, vol. 91, Sep. 2018, pp. 347-360.

Wei Y., et al., "RFC 9263: Network Service Header (NSH) Metadata Type 2 Variable-Length Context Headers", Internet Engineering Task Force (IETF), Aug. 2022, 11 pages.

* cited by examiner

SUSTAINABILITY-BASED SERVICE FUNCTION CHAIN BRANCHING

TECHNICAL FIELD

The present disclosure relates to networking using service function chains.

BACKGROUND

A Service Function Chain (SFC) allows automation of traffic flow between network services. Examples of network services that may be implemented in an SFC includes a firewall, transcoder, network address translation, load balancer, intrusion detection and prevention system, encryption, software-defined wide area networking (SD-WAN), etc.

A SFC creates a Service Plane and has applications across a variety of technologies, such as service programming with Segment Routing (SR), Network Functions Virtualization (NFV), Multi-Protocol Label Switching (MPLS), Network Service Header (NSH), etc. Examples of use cases include a data center environment mobile network environments, and online collaboration services. SFCs can be used even with integration of technologies, such as Segment Routing plus Network Service Header, and in multi-domain applications.

DESCRIPTION OF EXAMPLE EMBODIMENTS

Overview

Presented herein are techniques to add environmental-impact and energy sustainability criteria and support to service function chains (SFCs). These techniques enabling steering of network traffic that carries energy sustainability related metadata within in an SFC based on energy sustainability or "green criteria." This allows for achieving, for example, so-called "green Operations, Administration and Maintenance (OAM)", whether realized with Network Service Header (NSH), Segment Routing, Multi-protocol Label Switching (MPLS), etc. In other words, embodiments are presented herein for enhancing service functions (SFs) and SFCs to allow for finding an energy sustainable or green path in an SFC, and to allow for conveying environmental information as in-line metadata.

In one aspect, a method is provided that includes: receiving network traffic packets at a service function forwarder that is configured to forward the network traffic packets to a service function that is part of service function chain that includes a plurality of service functions; determining, by the service function forwarder, based on metadata contained in a header of the network traffic packets, a particular service function of a plurality of service functions in the service function chain to which the network traffic packets should be forwarded, wherein the metadata comprises energy sustainability criteria information that indicates one or more energy sustainability requirements to be considered when processing of the network traffic packets by a service function of the plurality of service functions in the service function chain; and forwarding, by the service function forwarder, the network traffic packets to the particular service function based on the determining.

Example Embodiments

While Service Function Chains (SFCs) are quite pervasive, there is no solution heretofore known for adding sustainability-based energy-optimized criteria to SFC creation, maintenance and processing of network traffic according to energy sustainability requirements.

This techniques presented herein add sustainability-based criteria and energy-optimized SFCs and service topology creation, maintenance, and branching decisions. These techniques achieve this by adding environmental-impact metadata and sustainability-based decision criteria for SFF (service function forwarder) selection and branching.

Figure 1:
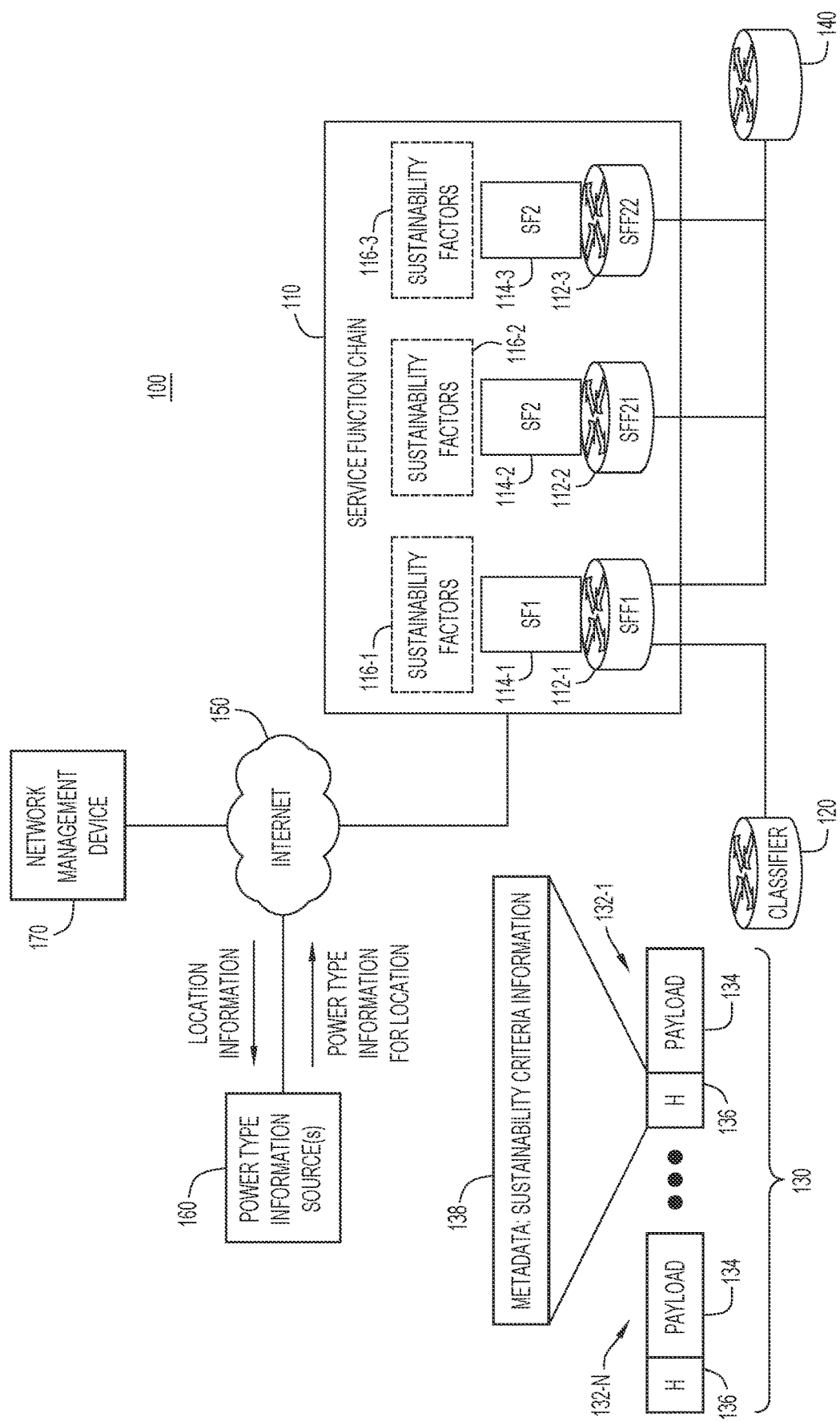
FIG. 1 is a block diagram of a system that includes a service function chain that is configured to steer traffic to service functions in the service function chain based on energy sustainability criteria information carried in a header of the traffic, according to an example embodiment.

Reference is now made to FIG. 1. FIG. 1 shows a block diagram of a system 100 that includes a SFC 110. In the example of FIG. 1, the SFC 110 comprises a service function forwarder (SFF) 112-1 (denoted SFF1) that hosts a service function (SF) 114-1 (denoted SF1), a SFF 112-2 (denoted SFF21) that hosts a SF 114-2 (denoted SF2), and a SFF 112-3 (denoted SFF22) that hosts a SF 114-3 which is the same SF as SF 114-2. SF 114-1 has associated sustainability factors 116-1, SF 114-2 has associated sustainability factors 116-2, and SF 114-3 has associated sustainability factors 116-3. Even though SF 114-2 is the same as SF 114-3, SF 114-2 may have sustainability factors 116-2 that are different than the sustainability factors 116-3 of SF 114-3.

A classifier node 120 receives network traffic comprising a packet flow 130 and directs packets 132-1 to 132-N to the SFC 110.

In accordance with the embodiments presented herein, the packets 132-1 to 132-N each include a payload field 134 and at least one header (H) 136. The header 136 includes metadata 138 containing energy sustainability criteria information. The energy sustainability criteria information indicates one or more energy consumption requirements to be considered when processing of the given packet by a SF of the plurality of service functions in the SFC 110. The header 136 may take the form of one of: a Network Service Header, a Segment Routing Header, a Multi-Protocol Label Switching (MPLS) Label, or Operations, Administration and Maintenance (OAM) header.

Network traffic egresses from the SFC 110 via egress node 140.

The one or more sustainability factors associated with respective ones of the plurality of SFs of the SFC 110 are used to determine to which particular service function to forward the network traffic packets in order to accommodate the energy sustainability criteria information of the given packet. The information used to derive the one of more sustainability factors of the respective service functions may be obtained from various sources.

Service function chaining allows deploying various network functions and virtual network functions (VNFs) in geographically distributed data centers. More generically, "domains" can be geographically, administrative, or technologically diverse. Different administrative domains collocated could potentially have different carbon intensity or emission factors that quantify how the electricity that is used by the respective service function is generated—clean/green, etc. FIG. 1 shows that a given service function forwarder in a service chain can be configured to query, via the Internet 150, one or more power type information source(s) 160, based on a location of the service function forwarder/service function to obtain the information used to derive the one or more sustainability factors of the respective service functions. In another example, a network management device 170 may obtain the location of a given service function using the techniques described herein and then use that information to query the power type information source(s) 160 to obtain the power type information for a given service function. Then, the network management device 170 may send a control plane message to the service function forwarder for the associated service function to configure/program the service function forwarder with sustainability factor information (derived from the power type information) for the service function. This enables the service function forwarder to determine how to direct network traffic packets, based on the sustainability criteria information carried in the metadata 138, to a given service function.

Boundaries of sustainability or "greenness" of power may be somewhat broad, such as state-size, province-size, or country-size. For example, this information can be obtained in the Electricity Maps map view at https://app.electricitymaps.com/map. Knowing the location of a network service or VNF (to the datacenter level, not the precise geo-location) can be used to query an appropriate information source about the cleanness of power used by that network service. The following approaches are provided, and whichever signaling or control-plane technique is used, the same general idea applies: obtain location through some existing or hereinafter developed means and use that location to obtain a power "cleanliness" factor from the power type information source(s) 160 that is then represented as a sustainability factor for that given service function.

One technique may involve using the location of a data center where a service function is deployed to query a power type information source, such as Electricity Maps referred to above (https://api-portal.electricitymaps.com/) or a governmental agency information resource, such as the U.S. Environmental Protection Agency (EPA) (Emissions and Generation Resource Integrated Database, eGRID, to obtain information, such as carbon intensity for electrical power generated in the location of that data center. These are just examples of power information sources, and a given country or region may have different information sources.

Location of the service function can be determined in several ways. In one example, a Service Function Chain aware node may discover which service functions are available in a given network using the techniques of https://datatracker.ietf.org/doc/html/draft-bernardos-sfc-discovery-04#section-4. As explained in that IETF draft, a Route Distinguisher (RD) can indicate the location of a service function based on IP address.

When an Application Layer Transport Optimization (ALTO) protocol is used, an ALTO server can be queried to obtain the "geolocation" property of a service function, according to techniques depicted in Endpoint Properties Extensions (https://www.ictf.org/proceedings/92/slides/slides-92-alto-6.pdf) or in 10—Multi-domain Service Function Chaining with ALTO (https://datatracker.ietf.org/doc/slides-102-sfc-10-multi-domain-service-function-chaining-with-alto/).

When the Border Gateway Protocol (BGP) is used to create service function chains, then BGP can be used to obtain location information of the service function forward. See the 3rd paragraph of Section 1 in Carrying Geo Coordinates in BGP (https://datatracker.ietf.org/doc/html/draft-chen-idr-geo-coordinates-02#section-1) and Slide 2 of Carrying Geo Coordinates in BGP (https://www.ietf.org/proceedings/96/slides/slides-96-idr-0.pdf).

When the Open Shortest Path First (OSPF) protocol or the Intermediate System to Intermediate System (ISIS) protocol are used for service function or service function forward distribution, the techniques of slide 2 of OSPF Geo Location (https://www.ietf.org/proceedings/95/slides/slides-95-ospf-5.pdf) and slide 2 of IS-IS Geo Location (https://www.ietf.org/proceedings/96/slides/slides-96-isis-2.pdf) may be used, such as is the case for Segment Routing (as set forth in RFC8665 and RFC8667).

Thus, the underlying facility of service function chaining, whichever realization is used, provides geo-location information that can be used to obtain, via an API or other database query, power type information (e.g., Carbon Intensity) for a given service function, from which one or more sustainability can be derived:

Greenhouse Gas (GHG) emissions=Energy (Power*Time)*Carbon Intensity, where Carbon Intensity may be defined as the amount of carbon by weight emitted per unit of energy consumed. One measure of carbon intensity is weight of carbon per British Thermal Unit (BTU) of energy.

Figure 2:
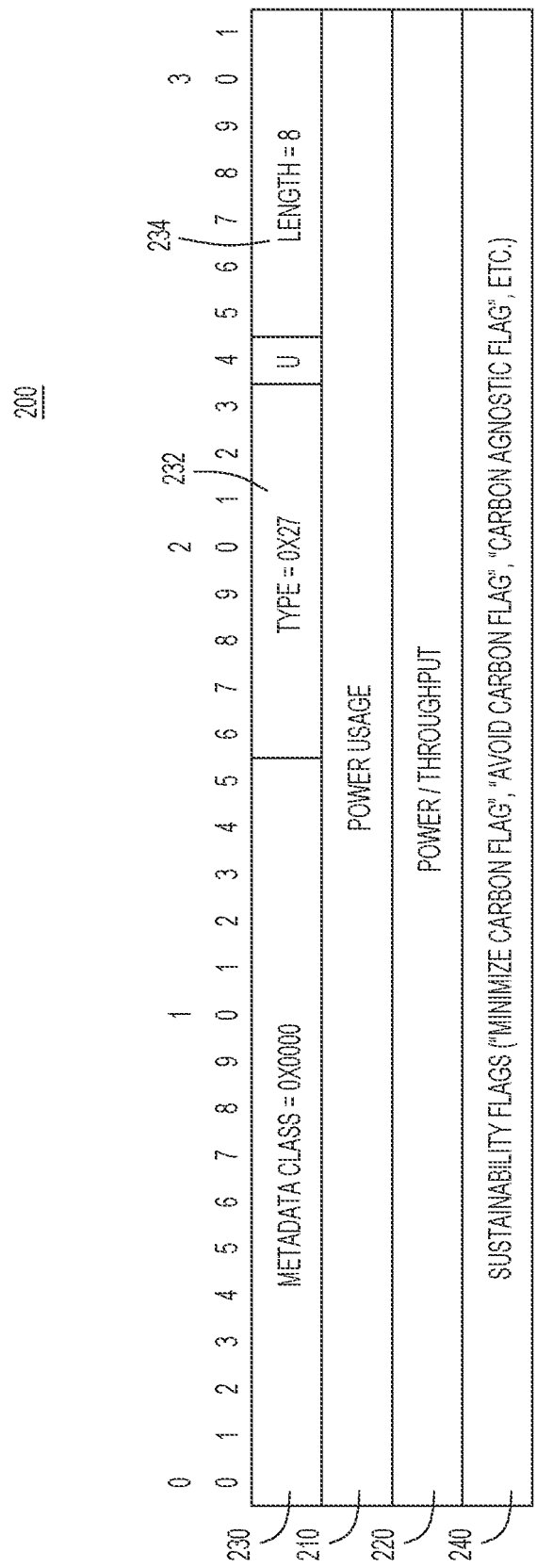
FIG. 2 is a diagram depicting an example of a header of network traffic packets that is configured to carry energy sustainability criteria information, according to an example embodiment.

Reference is now made to FIG. 2, which shows an example of a header that carries metadata for energy sustainability criteria information for a packet. In this example, the header is a NSH context header (that may be referred to as an "Energy Efficiency NSH Context Header") 200. The NSH context header 200 may use a MD Type-1 (fixed) or MD Type-2 (variable) metadata construct, and includes information not for use as a forwarding context but which contains a Power Usage information element 210 and a Power/Throughput information element 220. The Power Usage information element 210 may be in terms of power average/time period (e.g., per day), and the Power/Throughput information element 210 may be in terms of power throughput measured over a period of time, such as a day, such as Watts/Gigabit. The metadata class field 230, type field 232 and length field 234 are also included in the NSH context header 200 as defined for an MD Type-2 metadata construct, for example.

The NSH context header 200 may further include a Sustainability Flags information element 240 that contains one or more flags can be used, together with other information in the NSH context header 200, to determine how to branch/direct traffic in an SFC. For example, the Sustainability Flags information element 240 may include a "minimize carbon flag" that indicates that a service function should be selected that uses the least amount of carbon-sourced electrical power (when that choice is available in the SFC), an "avoid carbon flag" that indicates that a service function should be selected that does not use carbon-sourced electrical power, and perhaps a "carbon agnostic" flag that indicates that it is acceptable to use a service function that uses carbon-sourced electrical power. The branching criteria can thus involve a multitude of types of metadata starting with the Service Path Identifier/Service Index (SPI/SI) from the NSH (RFC 8300) together with the metadata of information elements 210, 220, and 240 shown in FIG. 2.

When the sustainability criteria information contained in the NSH context header 200 is used for SFC branching decisions, a Service Graph (through an SFC) is obtained that provides an energy optimized topology. SFCs and a NSH allow for the creation of a Service Plane overlay that can be exploited for energy optimized branching in an SFC.

Thus, in one embodiment, a NSH is used that carries energy sustainability criteria information, such as in the form of a sustainability-constrained instruction (e.g., only setup if power<X power threshold, one or more sustainability flags, etc.), and enables performing of branching selection among various downstream SFs based on energy efficiency or energy sustainability. This can be used to create a green topology as a subset of a service plane.

Figure 3:
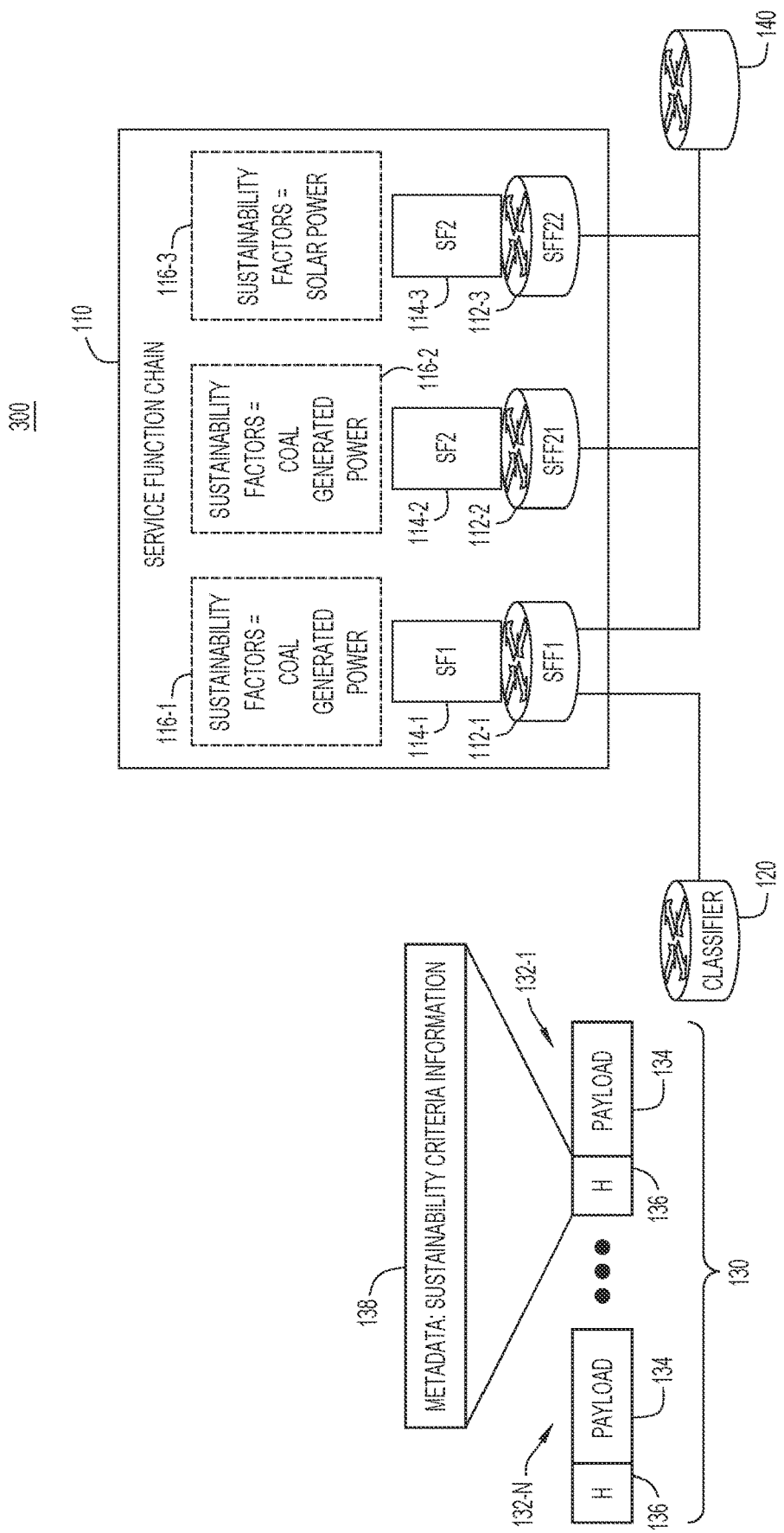
FIG. 3 is a diagram showing a service function chain similar to that of FIG. 1, and depicting examples of sustainability factors of various service functions, according to an example embodiment.

Reference is now made to FIG. 3. FIG. 3 shows a system 300 that includes an SFC 110 similar to that shown in FIG. 1. FIG. 3 shows that SFF1 and co-hosted SF1 are powered with coal-generated power. Thus, the sustainability factors 116-1 indicate coal-generated power. Similarly, SFF21 and co-hosted SF2 are powered with coal-generated power, and thus the sustainability factors 116-2 indicate coal-generated power. SFF22 and co-hosted SF2 are powered with solar-generated power, and thus, the sustainability factors 116-3 indicate solar-generated power. As explained above in connection with FIG. 1, SF2 (for example, a virtual firewall) is hosted in different service function forwarders or SFFs (which may be different data centers, clouds, or devices powered with different energy sources).

SFF21, powered with coal-generated electricity, may use the metadata 138 in the header 136 (e.g., MD Type-1 or Type 2 as per FIG. 2) of network traffic packets to decide if the traffic is to be steered to SF2 directly connected off of SFF21, or if a header rewrite should be performed in the NSH header to steer it towards SFF22 to apply the SF2 114-3 that is powered with a more sustainable type of power, such as solar-generated power.

In this way, the service function path creating the topological graph is rendered through a more sustainable path. This can apply also to "SR instructions" as a method of branching through an SFC graph.

Further embodiments may include, for example, introducing further discovery and instructions such as, level of depth of sleep for a node and a "wake-on-SF-magic-packet" equivalent on a service function chain, etc. Levels of sleep refers to shutting down increasingly more parts of a node (e.g., SFF) where a service function is deployed, such that it can be, for example, doing control plane processing and under clocked (periodic) data plane processing, or no data plane processing, or totally shut-down/asleep, thus achieving different levels of power saving. "Wake-on-SF-magic-packet" refers to receiving a specific packet with a particular magic number (0xCAFECACA, for example) that a node is configured to recognize and in response, wakes up to go into full power operation, his signaling can be introduced using the capability explained herein.

Figure 4:
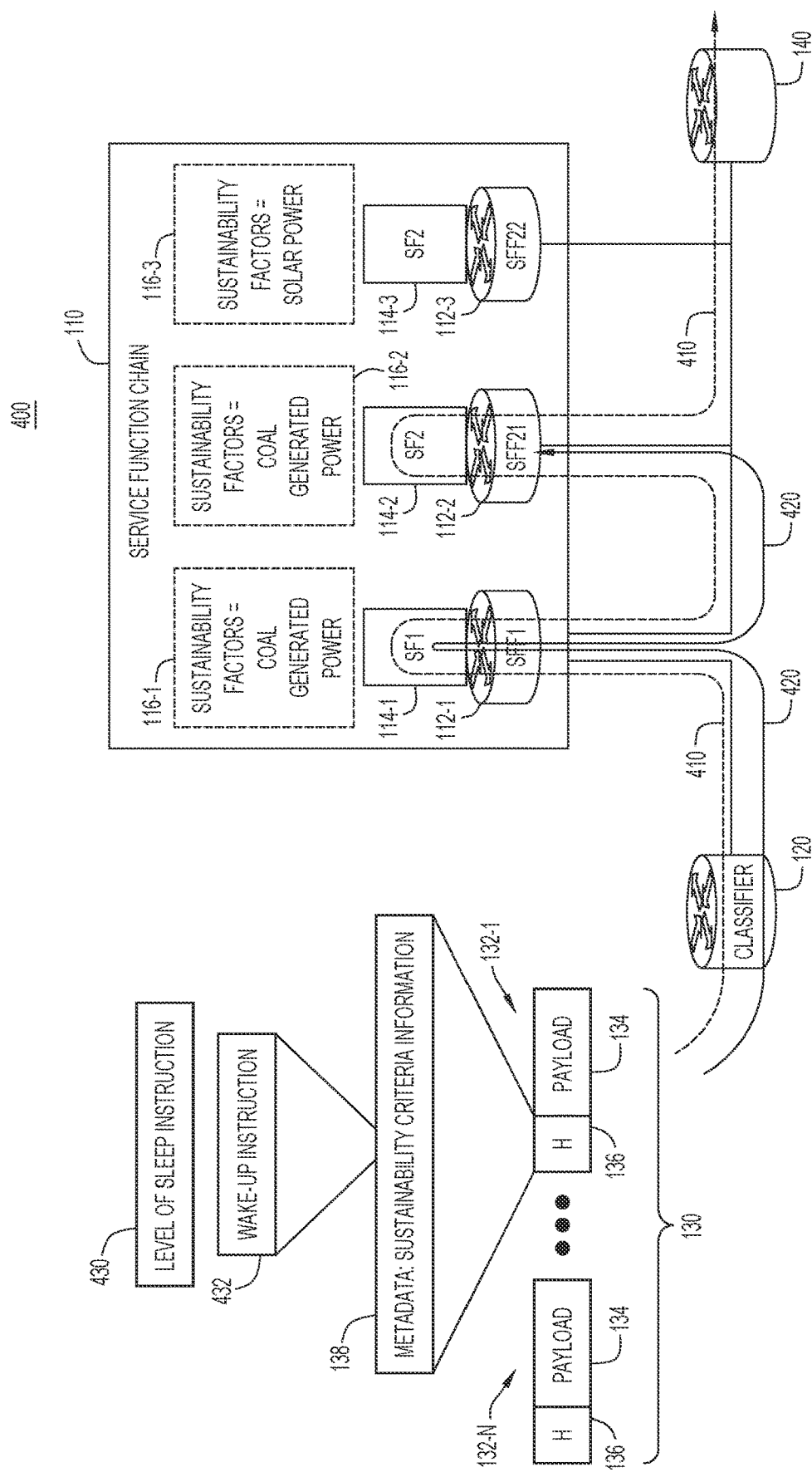
FIG. 4 is a diagram showing a service function chain similar to that of FIG. 1, and depicting additional examples of how traffic may be steered based on sustainability criteria information, according to an example embodiment.

Consider a system 400 having a topology shown in FIG. 4, which is similar to that shown in FIGS. 1 and 3. In this example, there is "red" traffic 410 and "green" traffic 420 directed by classifier node 120 into the SFC 110. SFF1 directs the red traffic 410 to SF1 and then to SFF21 after the service application by SF1. SFF21 receives the red traffic 410 that was offloaded after the service application by SF2 hosted at SFF21. Since the service is offloaded, SF2 on SFF21 may be in hibernate or in sleep mode. As an example, when SFF21 receives new traffic, e.g., green traffic 420, SFF21 uses the sustainability criteria information in the header of packets of the green traffic 420 to make a decision whether SF2 on SFF21 should be woken-up/brought up for application or if the traffic should be steered to SFF22. The holistic visibility of the performance load along with the energy source of different functions will help achieve balancing both in terms of performance and sustainability.

Again, the sustainability criteria information may include aspects such as Power Usage (average over a Day), Normalized Power—Power/Throughout (Watts/Gig), capabilities of depth of sleep modes, hibernation, and wake-on-SF. For example, as shown in FIG. 4, the metadata 138 may include a level for sleep instruction 430 and/or a wake-up instruction 432. The wake-up instruction 432 may be implemented by 64-bit "magic" number in a MD-Type 1 or MD-Type 2 "Wake-up Context Header" in an NSH. The sustainability criteria information may further include aspects related to carbon intensity (the aforementioned sustainability flags shown in FIG. 2 and described above), emission factors, or geo-location, and electricity provider.

It is also possible, as explained above, that SFF21 may read the metadata 138 in a packet that it receives and determines that the packet should be processed by SF2, but with SF2 powered by a more sustainable power source, such as solar power. In this case, SFF21 would do a header rewrite and send the packet to SFF22 where SF2 114-3, powered by solar power, is running, for application of SF2 to the packet.

In summary, service function chaining allows automation of traffic flow between network services (firewall, transcoder, load balancer, intrusion detection and prevention system, encryption, etc.) in a virtual network or cloud. A service function chain, architecturally, involves two capabilities: (1) traffic steering, and (2) carrying metadata.

Techniques are presented herein that leverage a header to carry energy and sustainability information for power and energy-aware service topology creation, maintenance, and branching decisions. While service function chaining is pervasive across many use-cases (data center, mobile networks, security, collaboration, etc.), there is no solution heretofore known for adding sustainability-based energy-optimized criteria to the service function creation/steering and maintenance. The power/energy source can play a key role in identifying the green/efficient service function chain or identifying if the traffic should be steered over an alternate chain or path in a service function chain for maintaining or improving the overall efficiency.

Figure 5:
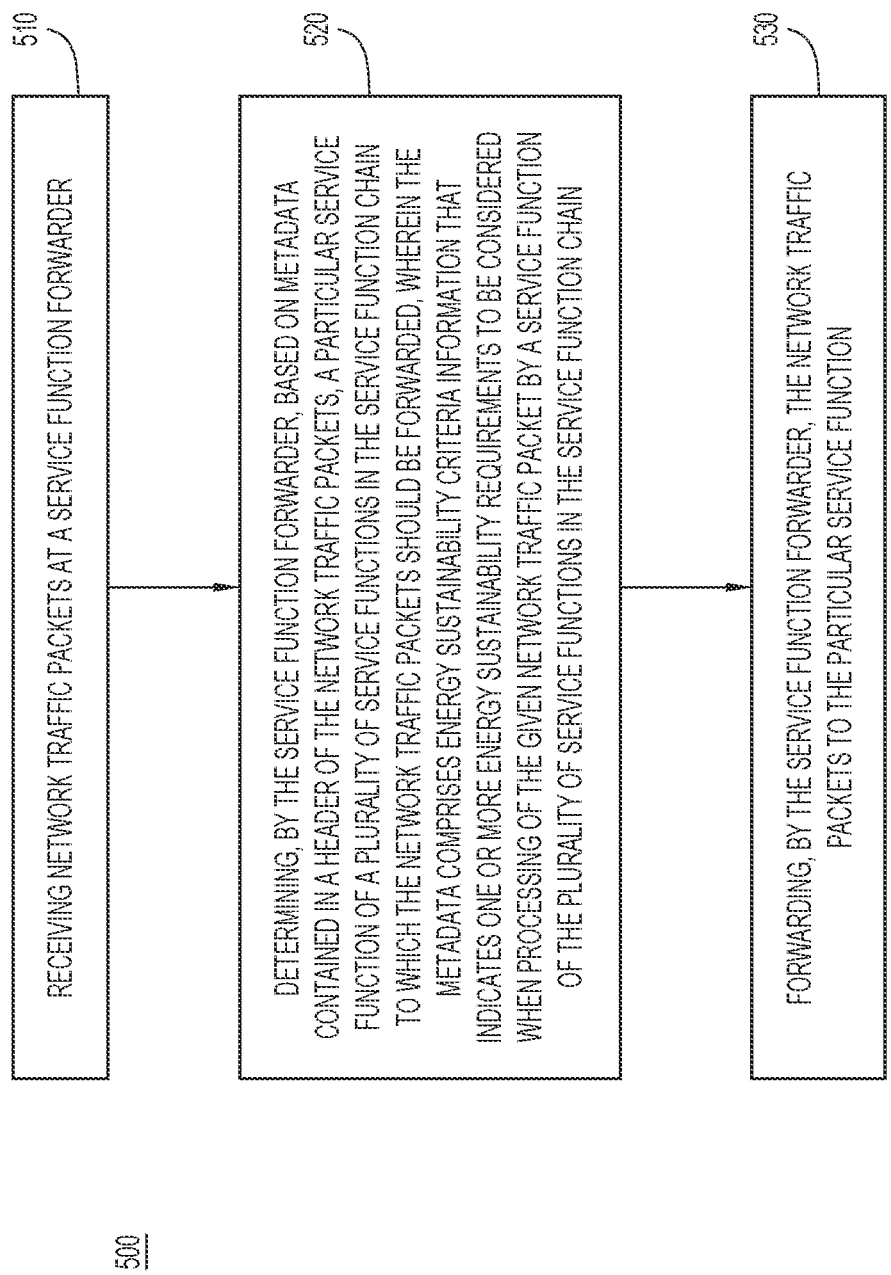
FIG. 5 is a flow chart depicting a method performed by a service function forwarder when receiving network traffic packets that include sustainability criteria information, according to an example embodiment.

Referring now to FIG. 5, a flow chart of a method 500 is now described. The method 500 is performed by a service function forwarder in a service function chain, as an example. The service function forwarder may be a network device, such as a router, switch, gateway, etc. At step 510, the method 500 includes receiving network traffic packets at a service function forwarder that is configured to forward the network traffic packets to a service function that is part of service function chain that includes a plurality of service functions. At step 520, the method 500 includes determining, by the service function forwarder, based on metadata contained in a header of the network traffic packets, a particular service function of a plurality of service functions in the service function chain to which the network traffic packets should be forwarded. The metadata comprises energy sustainability criteria information that indicates one or more energy sustainability requirements to be considered when processing of the network traffic packets by a service function of the plurality of service functions in the service function chain. At step 530, the method 500 includes forwarding, by the service function forwarder, the network traffic packets to the particular service function based on the determining step 520.

As described above in connection with FIG. 1, the method may further include obtaining, by the service function forwarder, information pertaining to one or more sustainability factors for a service function associated with the service function forwarder. The determining step 520 may include evaluating the energy sustainability criteria information contained in the metadata of the network traffic packets with the information pertaining to one or more sustainability factors associated with service function to determine to the particular service function to use for processing the network traffic packets.

Further, as described above in connection with FIGS. 1-3, the forwarding step 530 may involve performing a header rewrite of the network traffic packets to include branching information in the header of the network traffic packets that results in steering the network traffic packets to another service function forwarder that hosts the particular service function.

Figure 6:
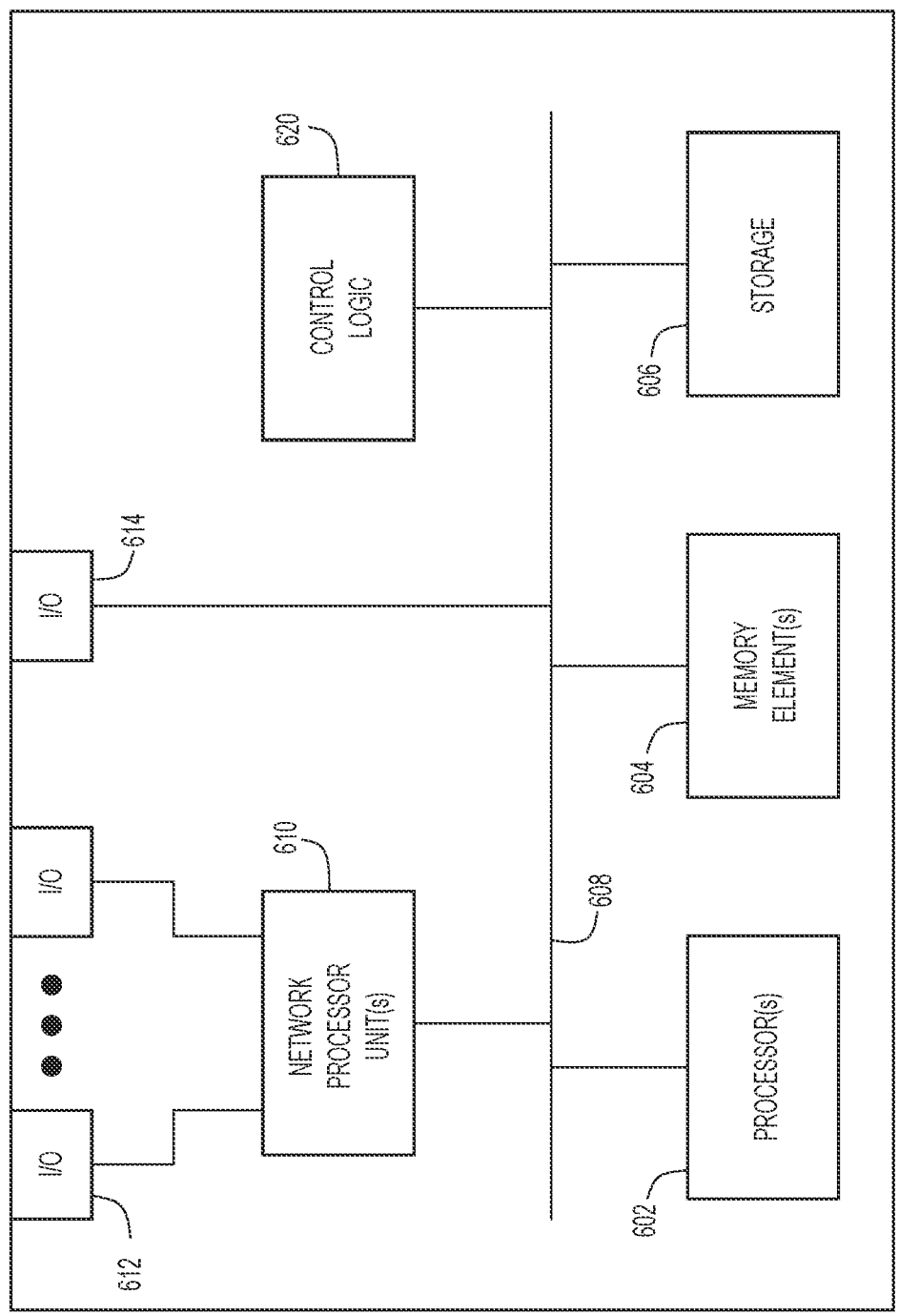
FIG. 6 is a block diagram of a device that may be configured to perform various techniques presented herein, including the method of FIG. 5, according to an example embodiment.

FIG. 6 above illustrates a hardware block diagram of a device 600 (e.g., a network or computing device) that may perform functions associated with operations discussed herein in connection with the techniques depicted in FIGS. 1-4.

In at least one embodiment, the device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for device 600 can overlap in any manner and are not limited to the specific allocation of instructions and/or operations described herein.

In at least one embodiment, processor(s) 602 is/are at least one hardware processor configured to execute various tasks, operations and/or functions for device 600 as described herein according to software and/or instructions configured for device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with device 600, and/or logic configured for memory element(s) 604 and/or storage 606. For example, any logic described herein (e.g., control logic 620) can, in various embodiments, be stored for device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of device 600 to communicate in order to exchange information and/or data. Bus 608 can be implemented with any architecture designed for passing control, data and/or information between processors, memory elements/storage, peripheral devices, and/or any other hardware and/or software components that may be configured for device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a method including: receiving network traffic packets at a service function forwarder that is configured to forward the network traffic packets to a service function that is part of service function chain that includes a plurality of service functions; determining, by the service function forwarder, based on metadata contained in a header of the network traffic packets, a particular service function of a plurality of service functions in the service function chain to which the network traffic packets should be forwarded, wherein the metadata includes energy sustainability criteria information that indicates one or more energy sustainability requirements to be considered when processing of the network traffic packets by a service function of the plurality of service functions in the service function chain; and forwarding, by the service function forwarder, the network traffic packets to the particular service function based on the determining.

In some aspects, the techniques described herein relate to a method, further including: obtaining, by the service function forwarder, information pertaining to one or more sustainability factors for a service function associated with the service function forwarder, wherein determining includes evaluating the energy sustainability criteria information contained in the metadata of the network traffic packets with the information pertaining to one or more sustainability factors associated with service function to determine to the particular service function to use for processing the network traffic packets.

In some aspects, the techniques described herein relate to a method, wherein forwarding includes: performing a header rewrite of the network traffic packets to steer the network traffic packets to another service function forwarder that hosts the particular service function.

In some aspects, the techniques described herein relate to a method, wherein the header is one of: a Network Service Header, a Segment Routing Header, a Multi-Protocol Label Switching (MPLS) Label, or Operations, Administration and Maintenance (OAM) header.

In some aspects, the techniques described herein relate to a method, further including: obtaining location information indicating a location of one or more service functions in the service function chain; and based on the location information, querying one or more power type information sources to obtain power source type information indicating power source types used for supplying power to the one or more service functions, wherein the one or more sustainability factors for the one or more service functions are derived from the power source type information.

In some aspects, the techniques described herein relate to a method, wherein obtaining the location information is obtained by one or more of: a Route Distinguisher (RD) information element for service function chain aware network nodes in a network; querying a server according to the Application Layer Transport Optimization (ALTO) protocol that returns a geolocation property of a service function; via the Border Gateway Protocol (BGP) used to create the service function chain; via the Open Shortest Path First (OSPF) or Intermediate System to Intermediate System (ISIS) protocol.

In some aspects, the techniques described herein relate to a method, wherein the energy sustainability criteria information includes a sustainability constrained instruction used in making a branching selection among the plurality of service functions in the service function chain based on energy efficiency and/or energy sustainability of respective service functions.

In some aspects, the techniques described herein relate to a method, wherein the energy sustainability criteria information includes a power usage criterion and a power/throughput criterion.

In some aspects, the techniques described herein relate to a method, wherein the energy sustainability criteria information includes information to indicate if a service function of the plurality of service functions should awaken for application to the network traffic packets or if the network traffic packets should be steered to a different service function in the service function chain.

In some aspects, the techniques described herein relate to an apparatus including: a network interface that enables communication of network traffic packets on behalf of a service function forwarder that is configured to forward the network traffic packets to a service function that is part of service function chain that includes a plurality of service functions; a memory; and a processor coupled to the network interface and the memory, wherein the processor is configured to execute instructions stored in the memory to, for network traffic packets received by the network interface, perform operations including: determining based on metadata contained in a header of the network traffic packets, a particular service function of a plurality of service functions in the service function chain to which the network traffic packets should be forwarded, wherein the metadata includes energy sustainability criteria information that indicates one or more energy sustainability requirements to be considered when processing of the network traffic packets by a service function of the plurality of service functions in the service function chain; and forwarding the network traffic packets to the particular service function based on the determining.

In some aspects, the techniques described herein relate to an apparatus, wherein the processor is further configured to perform operations including: obtaining information pertaining to one or more sustainability factors for a service function associated with the service function forwarder, wherein determining includes evaluating the energy sustainability criteria information contained in the metadata of the network traffic packets with the information pertaining to one or more sustainability factors associated with service function to determine to the particular service function to use for processing the network traffic packets.

In some aspects, the techniques described herein relate to an apparatus, wherein the processor is configured to perform forwarding by: performing a header rewrite of the network traffic packets to steer the network traffic packets to another service function forwarder that hosts the particular service function.

In some aspects, the techniques described herein relate to an apparatus, wherein the processor is further configured to perform operations including: obtaining location information indicating a location of one or more service functions in the service function chain; and based on the location information, querying one or more power type information sources to obtain power source type information indicating power source types used for supplying power to the one or more service functions, wherein the one or more sustainability factors for the one or more service functions are derived from the power source type information.

In some aspects, the techniques described herein relate to an apparatus, wherein the energy sustainability criteria information includes one or more sustainability flags that indicate one or more of: whether to prefer use of service functions that are powered by noncarbon sourced electrical power, whether to exclude use of service functions that are powered by carbon-sourced electrical power, or whether use of service functions that are powered by carbon-sourced electrical power is acceptable.

In some aspects, the techniques described herein relate to a system including: a service function chain including a plurality of service function forwarder nodes, each of which hosts a service function; a classifier node configured to receive network traffic packets and to direct network traffic packets into the service function chain; wherein at least one service function forwarder node is configured to perform operations including: receiving network traffic packets from the classifier node; determining based on metadata contained in a header of the network traffic packets, a particular service function of a plurality of service functions in the service function chain to which the network traffic packets should be forwarded, wherein the metadata includes energy sustainability criteria information that indicates one or more energy sustainability requirements to be considered when processing of the network traffic packets by a service function of the plurality of service functions in the service function chain; and forwarding the network traffic packets to the particular service function based on the determining.

In some aspects, the techniques described herein relate to a system, wherein the at least one service function forwarder node is further configured to perform: obtaining information pertaining to one or more sustainability factors for a service function associated with the service function forwarder, wherein determining includes evaluating the energy sustainability criteria information contained in the metadata of the network traffic packets with the information pertaining to one or more sustainability factors associated with service function to determine to the particular service function to use for processing the network traffic packets.

In some aspects, the techniques described herein relate to a system, wherein the at least one service function forwarder node is configured to perform a header rewrite of the network traffic packets to steer the network traffic packets to another service function forwarder that hosts the particular service function.

In some aspects, the techniques described herein relate to a system, wherein the energy sustainability criteria information includes one or more sustainability flags that indicate one or more of: whether to prefer use of service functions that are powered by noncarbon sourced electrical power, whether to exclude use of service functions that are powered by carbon-sourced electrical power, or whether use of service functions that are powered by carbon-sourced electrical power is acceptable.

In some aspects, the techniques described herein relate to a system, wherein the energy sustainability criteria information includes a sustainability constrained instruction used in making a branching selection among the plurality of service functions in the service function chain based on energy efficiency and/or energy sustainability of respective service functions.

In some aspects, the techniques described herein relate to a system, wherein the energy sustainability criteria information includes information to indicate if a service function of the plurality of service functions should awaken for application to the network traffic packets or if the network traffic packets should be steered to a different service function in the service function chain.

In some aspects, the techniques described herein relate to a computer program product or non-transitory computer readable storage media encoded with instructions, that when executed by a processor, cause the processor to perform operations including: receiving network traffic packets at a service function forwarder that is configured to forward the network traffic packets to a service function that is part of service function chain that includes a plurality of service functions; determining, by the service function forwarder, based on metadata contained in a header of the network traffic packets, a particular service function of a plurality of service functions in the service function chain to which the network traffic packets should be forwarded, wherein the metadata comprises energy sustainability criteria information that indicates one or more energy sustainability requirements to be considered when processing of the network traffic packets by a service function of the plurality of service functions in the service function chain; and forwarding, by the service function forwarder, the network traffic packets to the particular service function based on the determining.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X. Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    at a service function forwarder of a service function chain of service functions, wherein the service function forwarder is capable of shutting down increasingly more parts of the service function forwarder to achieve different levels of power savings:
    upon receiving network traffic packets, determining, based on metadata contained in a header of the network traffic packets, a particular service function of the service functions to which the network traffic packets should be forwarded, wherein the metadata comprises energy sustainability criteria information that indicates (i) a sustainability constrained instruction used for making a branching selection among the service functions based on energy efficiency and/or energy sustainability of respective service functions, and (ii) an operating instruction selected from level of sleep instructions to shut down one or more parts of the service function forwarder to achieve the power savings;
    responsive to the operating instruction, shutting down the one or more parts; and
    forwarding, by the service function forwarder, the network traffic packets to the particular service function based on the determining.

2. The method of claim 1, further comprising:
    obtaining, by the service function forwarder, information pertaining to one or more sustainability factors for a service function associated with the service function forwarder,
    wherein the determining includes evaluating the energy sustainability criteria information contained in the metadata of the network traffic packets with the information pertaining to the one or more sustainability factors associated with the service function to determine the particular service function to use for processing the network traffic packets.

3. The method of claim 2, wherein forwarding comprises:
    performing a header rewrite of the network traffic packets to steer the network traffic packets to another service function forwarder that hosts the particular service function.

4. The method of claim 2, wherein the header is one of: a Network Service Header, a Segment Routing Header, a Multi-Protocol Label Switching (MPLS) Label, or Operations, Administration and Maintenance (OAM) header.

5. The method of claim 2, further comprising:
    obtaining location information indicating a location of one or more service functions in the service function chain; and
    based on the location information, querying one or more power type information sources to obtain power source type information indicating power source types used for supplying power to the one or more service functions,
    wherein the one or more sustainability factors for the one or more service functions are derived from the power source type information.

6. The method of claim 5, wherein obtaining the location information is obtained by one or more of: a Route Distinguisher (RD) information element for service function chain aware network nodes in a network; querying a server according to an Application Layer Transport Optimization (ALTO) protocol that returns a geolocation property of a service function; via a Border Gateway Protocol (BGP) used to create the service function chain; via a Open Shortest Path First (OSPF) or Intermediate System to Intermediate System (ISIS) protocol.

7. The method of claim 1, wherein the energy sustainability criteria information includes a power usage criterion and a power/throughput criterion.

8. The method of claim 1, wherein the energy sustainability criteria information includes information to indicate if a service function of the service functions should awaken for application to the network traffic packets.

9. The method of claim 1, wherein the energy sustainability criteria information includes a sustainability flag indicating a carbon intensity associated with an energy source.

10. The method of claim 1, wherein:
    the service function forwarder is further capable of operating at full power; and
    the operating instruction is further selected from a wake-up instruction to wake-up the service function forwarder from a sleep mode to operate at the full power.

11. The method of claim 1, wherein:
    the increasingly more parts of the service function forwarder include control plane processing and under clocked data plane processing, no data plane processing, and totally shut-down.

12. An apparatus comprising:
    a network interface that enables communication of network traffic packets on behalf of a service function forwarder of a service function chain of service functions, wherein the service function forwarder is capable of shutting down increasingly more parts of the service function forwarder to achieve different levels of power savings;
a memory; and
a processor coupled to the network interface and the memory, wherein the processor is configured to execute instructions stored in the memory to perform operations including:
upon receiving the network traffic packets, determining based on metadata contained in a header of the network traffic packets, a particular service function of the service functions to which the network traffic packets should be forwarded, wherein the metadata comprises energy sustainability criteria information that indicates (i) a sustainability constrained instruction used for making a branching selection among the service functions based on energy efficiency and/or energy sustainability of respective service functions, and (ii) an operating instruction selected from level of sleep instructions to shut down one or more parts of the service function forwarder to achieve the power savings;
responsive to the operating instruction, shutting down the one or more parts; and
forwarding, by the service function forwarder, the network traffic packets to the particular service function based on the determining.

13. The apparatus of claim 12, wherein the processor is further configured to perform operations including:
obtaining information pertaining to one or more sustainability factors for a service function associated with the service function forwarder,
wherein the determining includes evaluating the energy sustainability criteria information contained in the metadata of the network traffic packets with the information pertaining to the one or more sustainability factors associated with the service function to determine the particular service function to use for processing the network traffic packets.

14. The apparatus of claim 13, wherein the processor is configured to perform forwarding by:
performing a header rewrite of the network traffic packets to steer the network traffic packets to another service function forwarder that hosts the particular service function.

15. The apparatus of claim 13, wherein the processor is further configured to perform operations including:
obtaining location information indicating a location of one or more service functions in the service function chain; and
based on the location information, querying one or more power type information sources to obtain power source type information indicating power source types used for supplying power to the one or more service functions,
wherein the one or more sustainability factors for the one or more service functions are derived from the power source type information.

16. The apparatus of claim 12, wherein the energy sustainability criteria information includes one or more sustainability flags that indicate one or more of: whether to prefer use of service functions that are powered by noncarbon sourced electrical power, whether to exclude use of service functions that are powered by carbon-sourced electrical power, or whether use of service functions that are powered by carbon-sourced electrical power is acceptable.

17. A system comprising:
a service function chain comprising service function forwarder nodes, each of which hosts a service function;
a classifier node configured to receive network traffic packets and to direct the network traffic packets into the service function chain; and
a processor including a memory unit coupled to a service function forwarder node in the service function chain and that is capable of shutting down increasingly more parts of the service function forwarder node to achieve different levels of power savings, wherein the processor is configured to perform operations including:
upon receiving the network traffic packets from the classifier node, determining based on metadata contained in a header of the network traffic packets, a particular service function of service functions in the service function chain to which the network traffic packets should be forwarded, wherein the metadata comprises energy sustainability criteria information that indicates (i) a sustainability constrained instruction used for making a branching selection among the service functions based on energy efficiency and/or energy sustainability of respective service functions, and (ii) an operating instruction selected from level of sleep instructions to shut down one or more parts of the service function forwarder node to achieve the power savings;
responsive to the operating instruction, shutting down the one or more parts of the service function forwarder node; and
forwarding the network traffic packets to the particular service function based on the determining.

18. The system of claim 17, wherein the processor including the memory unit coupled to the service function forwarder node is further configured to perform:
obtaining information pertaining to one or more sustainability factors for a service function associated with the service function forwarder node,
wherein the determining includes evaluating the energy sustainability criteria information contained in the metadata of the network traffic packets with the information pertaining to the one or more sustainability factors associated with the service function to determine the particular service function to use for processing the network traffic packets.

19. The system of claim 18, wherein the processor including the memory unit coupled to the service function forwarder node is configured to perform a header rewrite of the network traffic packets to steer the network traffic packets to another service function forwarder node that hosts the particular service function.

20. The system of claim 18, wherein the energy sustainability criteria information includes one or more sustainability flags that indicate one or more of: whether to prefer use of service functions that are powered by noncarbon sourced electrical power, whether to exclude use of service functions that are powered by carbon-sourced electrical power, or whether use of service functions that are powered by carbon-sourced electrical power is acceptable.

21. The system of claim 18, wherein the energy sustainability criteria information includes further information to indicate if a service function of the service functions should awaken for application to the network traffic packets.

* * * * *